United States Patent

Thompson et al.

[15] 3,694,566
[45] Sept. 26, 1972

[54] PRESSURE EQUALIZING ACCESSORY INSTALLABLE ALONG THE TOP SIDE OF ELECTRICAL CABLES

[72] Inventors: John T. Thompson, 244 Loring St., Los Angeles, Calif. 90024; George W. Gillemot, 2331-20th St., Santa Monica, Calif. 90405

[22] Filed: July 1, 1971

[21] Appl. No.: 158,727

[52] U.S. Cl. ............... 174/135, 98/122, 174/16 R, 220/44 A
[51] Int. Cl. .................................. H02g 15/00
[58] Field of Search ... 174/8, 11 R, 12 R, 14 R, 15 C, 174/16 R, 17 VA, 24, 37, 68 R, 70 R, 135; 98/122; 137/216; 200/150 H; 220/44 R, DIG. 27; 285/153, 154, DIG. 25

[56] References Cited

UNITED STATES PATENTS

| 327,468 | 9/1885 | Spalding | 174/16 R |
| 1,815,920 | 7/1931 | Lake | 220/44 A |
| 1,847,272 | 3/1932 | Schwendt et al. | 174/16 R |
| 2,011,561 | 8/1935 | Chase | 174/12 R |
| 2,146,311 | 2/1939 | Pittman et al. | 174/16 R X |
| 2,494,679 | 1/1950 | Ward, Jr. | 98/122 X |
| 2,620,087 | 12/1952 | Peterson | 220/44 A |
| 2,859,270 | 11/1958 | Patchin | 174/16 R |
| 3,564,119 | 2/1971 | Thompson et al. | 174/16 R X |

Primary Examiner—Laramie E. Askin
Attorney—W. D. Sellers et al.

[57] ABSTRACT

A pressure equalizing accessory for electrical cables installable along the upper side of the cable sheath. The accessory includes a tubular fitting anchorable to the sheath at intervals therealong and a downwardly opening U-shaped breather having one leg in communication with the upper end of the tubular fitting and the other end vented to the atmosphere and effective to safeguard against the admission of moisture and liquids generally while providing for free air flow as necessary to maintain equalized pressure conditions.

3 Claims, 4 Drawing Figures

PATENTED SEP 26 1972 3,694,566

JOHN T. THOMPSON
GEORGE W. GILLEMOT
INVENTORS.

BY
ATTORNEYS

PRESSURE EQUALIZING ACCESSORY INSTALLABLE ALONG THE TOP SIDE OF ELECTRICAL CABLES

This invention relates to electrical cables, and more particularly to an improved pressure equalizing accessory installable along the upper side of a cable sheath to prevent pressure differentials thereacross due to temperature changes and the like causes.

The present invention is related to but exhibits certain advantages over the pressure equalizer accessory disclosed in our United States Letters Patent No. 3,564,119, granted Feb. 16, 1971. That construction is designed for installation in the lower side of a horizontally supported cable whereas the present construction is designed for installation in the upper side of a similarly supported cable. The breather previously provided has a vertical air passage extending downwardly from the lower side of the cable whereas the present invention employs an inverted U-shaped passage communicating at one end with the atmosphere and at the other end with a tubular anchor fitting secured to the cable sheath. Typically, the present breather employs a tubular stem of a pressurizing valve unit well known to persons skilled in the electrical cable art and having well known means at its lower end anchorable in an opening through the cable sheath. The valve customarily present at the upper end of this fitting is removed and an inverted U-shaped breather member is installed about the upper end of the anchor fitting with its inlet end at a substantially lower level than the upper end of the tubular fitting. This accessory is installed at intervals along the cable sheath as well as to housings enclosing splice connections between two cable ends. Changing temperature conditions due to operating conditions of the cable or to prevailing atmospheric conditions can cause wide variations in the internal pressure of the cable but such pressure changes are avoided by the present invention without risk of the entrance of rainwater, snow and the like. The breather passage is preferably equipped with filtering means, such as a fine mesh screen, to provide additional protection against the entrance of dust, foreign matter and water vapor. In a preferred assembly this filter is held assembled between the inlet to the tubular fitting and the inverted passage means.

Accordingly, it is a primary object of the present invention to provide a unique and inexpensive easily installed pressure equalizing accessory for electrical cables.

Another object of the invention is the provision of a pressure equalizing breather accessory for installation along the upper side of a horizontally supported electrical cable and operable to prevent pressure differentials between the interior and exterior of a cable while preventing the entry of moisture.

These and other more specific objects will appear upon reading the following specification and claims and upon considering in connection therewith the attached drawing to which they relate.

Referring now to the drawing in which a preferred embodiment of the invention is illustrated:

Figure 1:
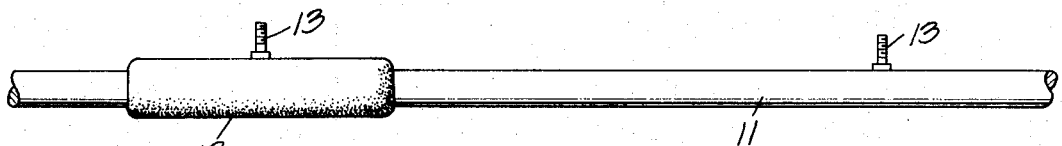
FIG. 1 is a fragmentary elevational view of an electrical cable having the lower portion of the invention fitting installed therein and ready to receive the upper subassembly of the accessory.
Figure 2:
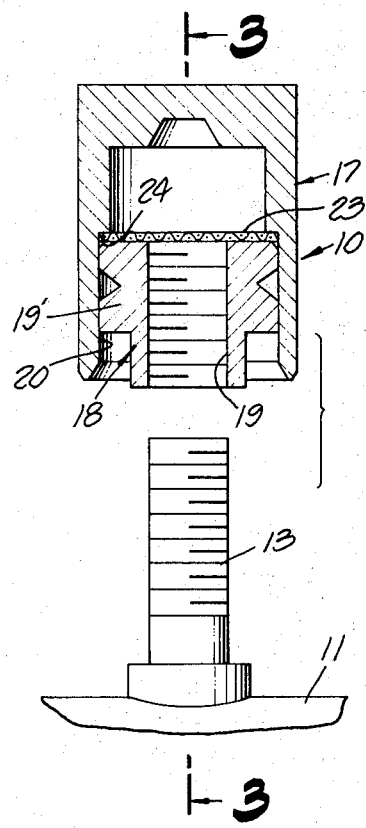
FIG. 2 is an exploded view, partly in section, on an enlarged scale showing the anchor means installed in the cable and in readiness to receive the upper subassembly of the accessory.
Figure 3:
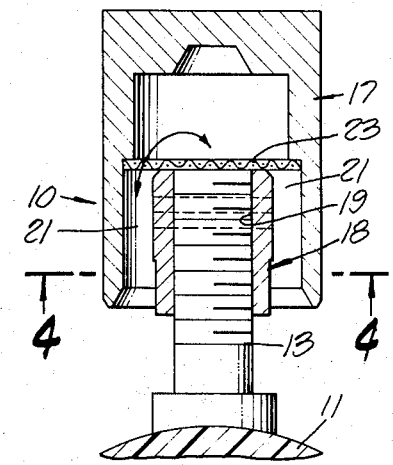
FIG. 3 is a view similar to FIG. 2 but taken along the line 3-3 of FIG. 2 and showing the parts assembled.

In FIG. 1, there is shown a typical electrical cable for communication conductors in readiness to receive the cap assembly for the invention pressure equalizing assembly, designated generally 10. Cable 11, as there shown, includes a conventional splice assembly 12 interconnecting adjacent sections of the cable. The tough outer sheath of the cable has firmly assembled to it a threaded tubular fitting 13 of a type well known in this art for use in charging the interior of the cable with pressurized air to safeguard against the entry of moisture. These fittings, when used for pressurizing purposes, are provided with a self-closing check valve near their outer end, but when such fittings are employed for pressure equalizing purposes the valve is removed leaving the interior of the passage free for the flow of air in either direction. Fittings 13 are located at intervals along the cable and this may include the splice housing 12, as indicated in FIG. 1.

It will be understood that tubular fittings 13 are preferably installed in the cable sheath after the cable has been suspended in a horizontal position in the usual manner. It is then known that the fittings 13 can be installed in openings opening upwardly through the top side of the sheath with assurance that the cable will remain in this position with their upper ends facing upwardly.

Figure 4:
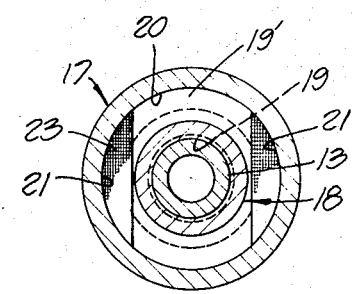
FIG. 4 is a cross sectional view taken along line 4—4 on FIG. 3.

Assembled over the outer end of each fitting 13 is an assembly 17 providing an inverted U-shaped passage for the flow of air in either direction. Assembly 17 comprises a deep imperforate cup-shaped member into which is pressed a T-shaped member 18. The T-stem portion of this fitting has a threaded bore 19 mateable with the threads of member 13. T-head portion 19' has a length selected to have a snug frictional fit with the interior sidewall 20 of member 17. Since the opposite lateral sides of the T-head are cut away, as is best shown in FIG. 4, there is provided a passageway 21 along either side of the T-head along which air can pass. A fine mesh filtering screen 23 is preferably assembled within and held captive between the top surface of the T-shaped member 19 and a shoulder 24 formed about the inner sidewall of cup member 17. The fine mesh screen permits air to pass freely but blocks the passage of dust and water in liquid or vapor form.

From the foregoing it will be quite apparent that the assembly of the cap unit 17 over the outer end of tubular fitting 13 completes an inverted U-shaped air passage having one leg formed in major part by the interior of fitting 13 and the outer leg formed by the air passages 21 extending downwardly along either side of this fitting and being interconnected in the bight portion of the passage.

As is well known, the temperature interiorly of a cable exposed to the sun varies widely over a 24 hour span. A relatively small volume of air is present within the cable but the pressure of this air can vary widely in the absence of provision for breathing and pressure equalization. Installation of the present invention provides automatic and continuous pressure equalization by permitting flow of air into and out of the cable as the cable temperature rises and falls while preventing the entry of water or moisture.

It will likewise be apparent that the invention breather and pressure equalizer is effective to prevent entry of water should a portion of the cable become submerged as can happen during severe storms or flood conditions. During such conditions the internal and external pressures of the cable are constantly equalized. The water will rise about the sides of the cable and upwardly along equalizer 10 and above the lower rim edge of the cup shaped member 17. Since the interior of this member is sealed, an air pocket will form within member 17 and act to prevent the water from rising along the interior of the fitting. Accordingly and for this reason the equalizer provides a reasonable degree of protection against entry of water even under cable flooding conditions.

While the particular pressure equalizing accessory installable along the top side of electrical cables herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. A cable pressure equalizing accessory for installation along the upper side of a horizontally supported cable, said accessory comprising: a threaded tubular fitting anchorable in an upright position in an opening through the upper side of a cable sheath, a T-shaped member having a threaded through bore axially of its T-stem and detachably mounted on the upper end of said tubular fitting, the ends of the T-head of said T-shaped member being concentric with the axis of said through bore, a deep inverted cup-shaped member having an annular shoulder projecting inwardly from the interior sidewall thereof, porous filtering means normally held assembled against said shoulder by the T-head of said T-shaped member, the ends of which T-head have a press fit with the interior sidewall of said cup-shaped member, and the aforesaid components cooperating therewith to provide a downwardly opening inverted U-shaped breather passage having one end in open communication with the upper end of said tubular fitting and its other end in communication with the atmosphere at a lower level and effective to safeguard against the entrance of moisture while permitting breathing as necessary to avoid a pressure differential between the interior and exterior of a cable equipped with said accessory.

2. An accessory as defined in claim 1 characterized in that said cup-shaped member has imperforate bottom and sidewalls.

3. An accessory as defined in claim 1 characterized in that the breather passage extending through the bight portion of said U-shaped breather passage constitutes an air lock safeguarding against the entrance of liquid into said tubular fitting so long as the pressure differential between the interior and exterior of a cable equipped therewith is substantially zero.

* * * * *